(12) United States Patent
Li (10) Patent No.: US 9,912,236 B2
(45) Date of Patent: Mar. 6, 2018

(54) SOFT START SWITCHING POWER SUPPLY SYSTEM

(71) Applicant: Chengdu Monolithic Power Systems Co., Ltd., Chengdu (CN)

(72) Inventor: Lei Li, Chengdu (CN)

(73) Assignee: Chengdu Monolithic Power Systems Co., Ltd., Chengdu (CN)

( * ) Notice: Subject to any disclaimer, the term of this patent is extended or adjusted under 35 U.S.C. 154(b) by 0 days.

(21) Appl. No.: 15/606,586

(22) Filed: May 26, 2017

(65) Prior Publication Data

US 2017/0264195 A1 Sep. 14, 2017

Related U.S. Application Data

(63) Continuation of application No. 14/457,997, filed on Aug. 12, 2014, now abandoned.

(30) Foreign Application Priority Data

Aug. 12, 2013 (CN) .......................... 2013 1 0349069

(51) Int. Cl.
*H02M 3/156* (2006.01)
*H02M 1/36* (2007.01)
*H02M 3/158* (2006.01)
*H02M 3/06* (2006.01)

(52) U.S. Cl.
CPC ............. *H02M 3/156* (2013.01); *H02M 1/36* (2013.01); *H02M 3/06* (2013.01); *H02M 3/1588* (2013.01)

(58) Field of Classification Search
CPC .... H02M 3/156; H02M 3/157; H02M 3/1588; G05F 1/468
See application file for complete search history.

(56) References Cited

U.S. PATENT DOCUMENTS

| | | | |
|---|---|---|---|
| 6,969,977 B1 * | 11/2005 | Smith | H02M 1/36 323/222 |
| 7,928,715 B2 | 4/2011 | Shibata et al. | |
| 7,948,273 B2 | 5/2011 | Lee et al. | |
| 8,717,002 B2 | 5/2014 | Xi et al. | |
| 2007/0114986 A1 * | 5/2007 | Yoshii | H02M 3/156 323/288 |
| 2009/0039851 A1 * | 2/2009 | Fukushi | H02M 1/088 323/283 |
| 2009/0146633 A1 * | 6/2009 | Karasawa | H02M 1/36 323/290 |
| 2010/0201336 A1 | 8/2010 | Chen et al. | |

(Continued)

*Primary Examiner* — Fred E Finch, III
*Assistant Examiner* — Rafael O. De León Domenech
(74) *Attorney, Agent, or Firm* — Perkins Coie LLP (57) ABSTRACT

A switching power supply system includes a switching converter, to convert an input voltage into an output voltage and to generate a switching signal; a feedback circuit, to generate a feedback signal; an error amplifier to generate an error signal; a triangle signal generator to generate a triangle signal; a constant on time control circuit to receive error signal and the triangle signal, and to generate a constant on time control signal to control power switch; in the system. The triangle signal has a DC bias based on either a soft start signal or a second reference signal. The system could perform soft start function and meanwhile keep matching between the error signal and the triangle signal.

18 Claims, 9 Drawing Sheets

(56) References Cited

U.S. PATENT DOCUMENTS

| | | | |
|---|---|---|---|
| 2012/0049829 A1* | 3/2012 | Murakami | H02M 1/32 323/288 |
| 2012/0091978 A1* | 4/2012 | Ishii | H02M 1/36 323/271 |
| 2013/0002223 A1 | 1/2013 | Xi et al. | |
| 2013/0141069 A1* | 6/2013 | Li | G05F 1/575 323/283 |
| 2013/0241507 A1* | 9/2013 | Hara | G05F 1/10 323/282 |
| 2014/0375286 A1* | 12/2014 | Jiang | H02M 3/156 323/271 |
| 2015/0042299 A1 | 2/2015 | Li | |
| 2015/0162830 A1* | 6/2015 | Dong | H02M 1/36 323/271 |

* cited by examiner

SOFT START SWITCHING POWER SUPPLY SYSTEM

CROSS-REFERENCE TO RELATED APPLICATION(S)

This application is a continuation of U.S. patent application Ser. No. 14/457,997 filed Aug. 12, 2014, which claims priority to CN application No. 201310349069.0, filed on Aug. 12, 2013, both of which are incorporated herein by reference.

TECHNICAL FIELD

The present invention relates to circuitry, and more particularly but not exclusively relates to switching power supply system and associated controller.

BACKGROUND

In the area of switching power supply, constant on time control is widely utilized in the industry due to its excellent performance of transient response, simple structure of control circuit and smooth switching of control method.

According to prior art, a power supply controller applying constant on time control method usually compares an error signal with a triangle signal that is generated according to an input voltage and an output voltage, and the output of the controller triggers a timer to generate a system control signal. During this process, the amplitude of error signal should be matched with the amplitude of the triangle signal for currently triggering the timer. To match amplitude, the triangle signal comprises a fixed direct current (DC) bias in convention. However, a fixed DC bias may constrain the range of the output voltage of the power supply system, and also make it difficult to integrate a soft start function into the controller.

Meanwhile, in prior, the error signal is usually required to change smoothly to make the power supply system stable. When the system is lightly loaded, the system may be operating in a discontinuous-current mode. Under such mode, all power switches in the system may be turned off for a period in each operational cycle. The error signal is gradually declining during this period, which results a relatively larger difference between the error signal and the triangle signal. At this time, the system transient response performance is seriously deteriorated.

SUMMARY

A switching power supply system, comprising: a switching converter, comprising at least one power switch, wherein by means of turning the power switch on and off, the switching converter converts an input voltage into an output voltage, and wherein a switching signal is generated accordingly; a feedback circuit, receiving the output voltage, operable to generate a feedback signal accordingly; an error amplifier, configured to generate an error signal according to the feedback signal and the signal having smaller amplitude between a soft start signal and a first reference signal; a triangle signal generator, configured to generate a triangle signal according to the soft start signal, the switching signal, the output voltage and a second reference signal; a constant on time control circuit, coupled to the error amplifier and the triangle signal generator, the constant on time control circuit configured to receive the error signal and the triangle signal, and operable to generate a constant on time control signal to control the at least one power switch; and wherein the triangle signal comprises a DC bias, and wherein the DC bias relates to the signal having smaller amplitude between the soft start signal and the second reference signal.

BRIEF DESCRIPTION OF THE DRAWINGS

Non-limiting and non-exhaustive embodiments are described with reference to the following drawings. The drawings are not depicted to scale and only for illustration purpose.

The use of the same reference label in different drawings indicates the same or like components.

DETAILED DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Although the specification proposes some embodiments, it should not be understood as a limitation of the present invention. By reading the above text, one skilled in relevant art may master transformations or variations other than the described embodiments. For example, the above embodiments take n-channel device as example, however, by change the conductivity types of semiconductor region, the embodiments of the present invention may also applied in p-channel device. Therefore these transformations or variations should be included in the scope of protection of the present invention.

Figure 1:
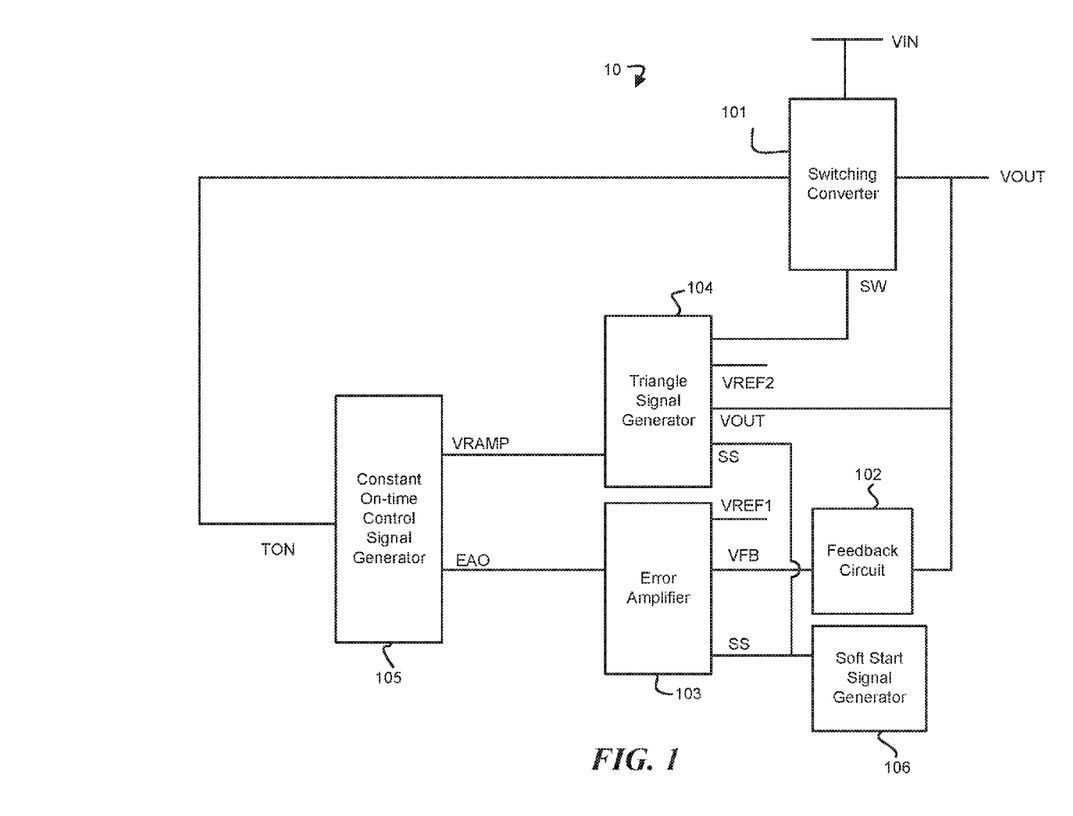
FIG. 1 illustrates a block diagram of a switching power supply system 10 according to an embodiment of the present invention.

FIG. 1 illustrates a block diagram of a switching power supply system 10 according to an embodiment of the present invention. As shown in FIG. 1, the switching power supply system 10 comprises a switching converter 101 and a system controller. The switching converter 101 has at least one power switch. Hereon and hereinafter, the item "power switch" refers to switch configured to transfer energy from input of the switching power supply to the output of the switching power supply system. By turning the power switch on and off, an input voltage VIN is converted to an output voltage VOUT and a switching signal SW is generated. The system controller comprises a feedback circuit 102, an error amplifier 103, a triangle signal generator 104, and a constant on time controller 105. The feedback circuit 102 receives the output voltage VOUT and generates a feedback signal VFB accordingly. The error amplifier 103 is coupled to the feedback circuit 102. The error amplifier 103 compares a first reference signal VREF1 and a soft start signal SS, and chooses the signal having smaller amplitude between the two signals. The error amplifier 103 then generates a error signal EAO according to the chosen signal (either VREF1 or SS) and the feedback signal VFB. The triangle signal generator 104 is coupled to the switching converter 101, configured to generate a triangle signal VRAMP according to the soft start SS, a second reference signal VREF2, the switching signal SW and the output voltage VOUT. The soft start signal SS rises smoothly when the system is starting, so as to prevent voltage overshooting. The constant on time controller 105 is coupled to the error amplifier 103 and the triangle signal generator 104. The constant on time controller 105 receives the error signal EAO and the triangle signal VRAMP, and generate a constant on time control signal TON according to the above two signals. The control signal TON controls the power switch or switches in switching converter 101.

The triangle signal VRAMP comprises a DC bias. The DC bias relates to the signal having smaller amplitude between the soft start signal SS and the second reference signal VREF2. When the system is starting, the soft start signal SS is smaller than both the first reference signal VREF1 and the second reference signal VREF2. Therefore, triangle signal VRAMP and the error signal EAO are both related with the soft start signal SS, and thus could match with each other during the system starting.

Meanwhile, because the DC bias of triangle signal VRAMP comprises either an element of soft start signal SS or the second reference signal VREF2, the DC bias is automatically regulated according to the variation of the output voltage VOUT, so that the triangle signal VRAMP could match with the error signal EAO having different amplitude. As a result, the range of the output voltage VOUT in switching power supply system 10 may be largely expanded.

In one embodiment, the first reference signal VREF1 is equal to the second reference signal VREF2.

In one embodiment, the switching power supply system 10 further comprises a soft start signal generator 106. When the switching power supply system 10 is starting, the soft start signal generator 106 generates the soft start signal SS. In other embodiment, the soft start signal SS may be provided by an external signal source.

Figure 2:
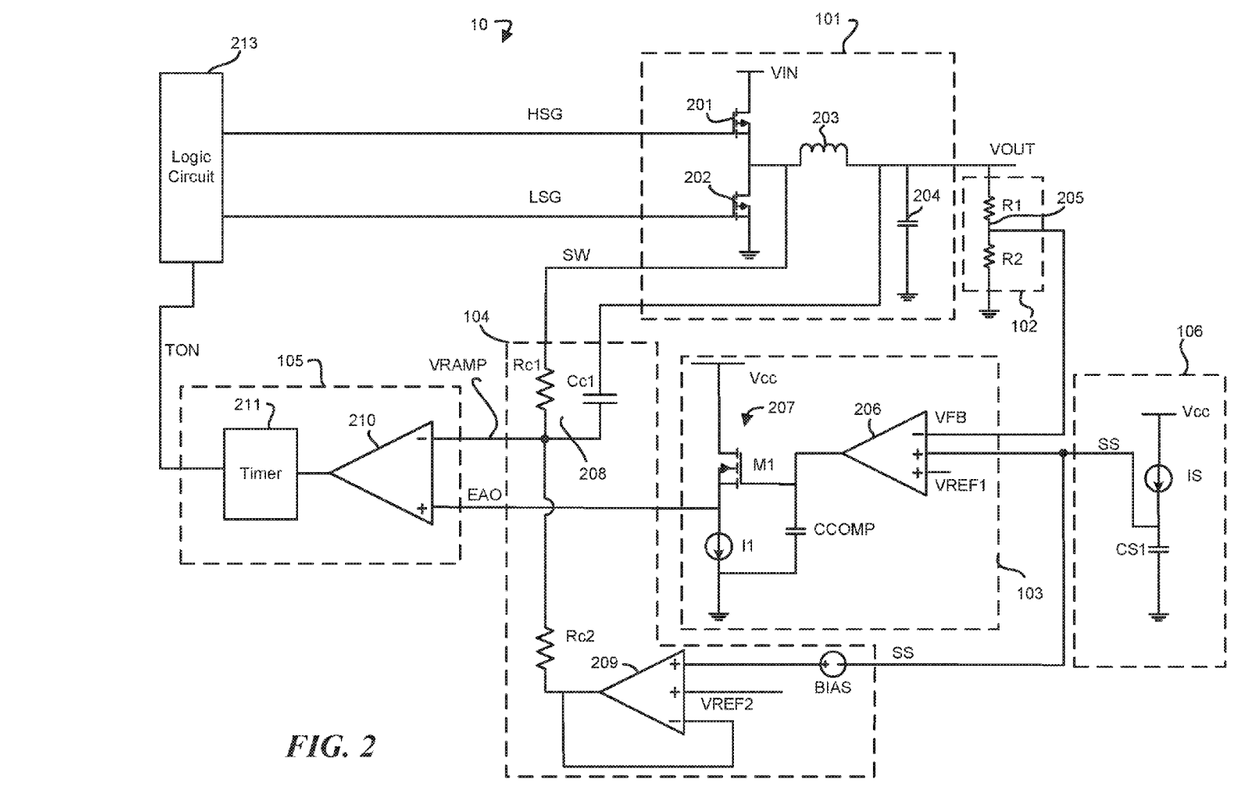
FIG. 2 illustrates a schematic circuit diagram of the switching power supply 10 according to an embodiment of the present invention.

FIG. 2 illustrates a schematic circuit diagram of the switching power supply 10 according to an embodiment of the present invention. As shown in FIG. 2, the switching converter 101 is a synchronously rectifying buck converter, comprising a primary power switch 201, a synchronous rectifier 202, an output inductor 203 and an output capacitor 204. One with ordinary skill in the art should understand that in other embodiments, a free-wheel diode may replace the synchronous rectifier 202. In yet some other embodiments, switching converter 101 may apply different circuit topology well known by the artisan in the art, for example, boost converter, buck-boost converter, forward converter, fly-back converter, and etc.

The feedback circuit 102 comprises a resistor divider 205, comprising resistors R1 and R2. The feedback circuit 102 is coupled to an output terminal OUT of the switching converter 101 to receive the output voltage VOUT. The feedback signal VFB is generated on a junction between the resistors R1 and R2. The error amplifier 103 comprises an amplifier 206 and a buffer 207. The amplifier 206 has two non-inverting input terminals, an inverting input terminal and an output terminal, wherein the inverting terminal receives the feedback signal VFB, and the two non-inverting terminals respectively receive the first reference signal VREF1 and the soft start signal SS. The amplifier 206 chooses the signal having smaller amplitude between the first reference signal VREF1 and the soft start signal SS, and compare this chosen signal with the feedback signal VFB. The buffer 207 comprises a capacitor CCOMP, a metal oxide semiconductor field effect transistor (MOSFET) M1 and a current source I1. The capacitor CCOMP is coupled between the output terminal of the amplifier 206 and a system reference ground GND. The MOSFET M1 is coupled to the output terminal of the amplifier 206 with a gate electrode, and coupled to a negative terminal of the current source I1 with a source electrode, and receives a system power supply voltage VCC with a drain electrode. A positive terminal of the current source I1 is connected to the system reference ground GND. In the illustrated embodiment, the source electrode of the MOSFET M1 provides the error signal EAO.

The triangle signal generator 104 comprises a voltage follower 209 and a RC network 208, wherein the RC network 208 comprises resistors Rc1, Rc2 and a capacitor Cc1. A first terminal of the resistor Rc1 is coupled to a junction of the primary switch 201 and the synchronous rectifier 202 to receive the switching signal SW. A second terminal of the resistor Rc1 is coupled to a first terminal of the resistor Rc2. Two terminals of the capacitor Cc1 are respectively coupled to the output terminal OUT of the switching converter 201 and a second terminal of the resistor Rc2. The second terminal of the resistor Rc1 provides the triangle signal VRAMP. The voltage follower 209 has two non-inverting input terminals, an inverting input terminal and an output terminal, wherein the two non-inverting input terminals respectively receive the soft start signal SS and the second reference signal VREF2, and wherein the inverting input terminal is coupled to the output terminal of the voltage follower 209. The output terminal of the voltage follower 209 is further coupled to the second terminal of the resistor Rc2, configured to choose the signal having smaller amplitude between the soft start signal SS and the second reference signal VREF2, and then follow this chosen signal. In one embodiment, the soft start signal SS is provided to the input terminal of the voltage follower 209 via a bias voltage source BIAS. The bias voltage source BIAS has a bias voltage Vbias. In other embodiments, the soft start signal SS may be biased by an internal voltage source or resistor in soft start signal generator 106.

One with ordinary skill in the art should understand that in other embodiments, the triangle signal generator may have different circuit structure or elements to perform similar functions described above.

Seen in FIG. 2, in the illustrated embodiment, the constant on time control circuit 105 comprises a pulse width modulation (PWM) comparator 210 and a timer 211, wherein the PWM comparator 210 has a non-inverting input terminal, an inverting input terminal and an output terminal. The non-inverting input terminal and the inverting input terminal of the PWM comparator 210 respectively receive the error signal EAO and the triangle signal VRAMP. In one embodiment, the PWM comparator 210 is a hysteresis comparator. The timer 211 is coupled to the output terminal of the comparator 210, configured to generate the constant on time control signal TON on its output terminal according to the output of the comparator 210. In the illustrated embodiment, the switching power supply system 10 further comprises a logic circuit 213, coupled to the output terminal of the timer 211. The logic circuit 213 receives the constant on time control signal TON, operable to generate at least one control signal for controlling the power switch or power switches in the system. In the illustrated embodiment, the logic circuit 213 generates a high side signal HSG to control the primary switch 201 and a low side signal LSG to control the synchronous rectifier 202 accordingly. In other embodiments, the constant on time control signal TON may directly control the primary switch 201.

In one embodiment, the switching power supply system 10 further comprises a soft start signal generator 106. In the illustrated embodiment shown in FIG. 2, the soft start signal generator 106 comprises a current source IS and a capacitor CS1, wherein the current source IS and the capacitor CS1 are coupled in series between system power supply voltage VCC and the system reference ground GND. A junction between the current source IS and the capacitor CS1 provides the soft start signal SS. One with ordinary skill in the art could understand that in other embodiments, the soft start signal generator 106 may has different circuit structure to generate a smoothly rising soft start signal SS during the system starting.

In one embodiment, amplifier 206 in the error amplifier 103 has two non-inverting input terminals and an inverting input terminal, wherein the two non-inverting input terminals receive the first reference signal VREF1 and the soft start signal SS, and operable to choose the signal having smaller amplitude between the first reference signal VREF1 and the soft start signal SS, to compare this chosen signal with the feedback signal VFB.

One with ordinary skill in the art could further understand that the switching power supply system 10 is not intended to be limited by the circuit structure shown in FIG. 2. In other embodiments, the switching power supply system 10 may comprise circuit structure and elements different from these shown in FIG. 2, but may still perform similar functions as described above. For an instance, in certain embodiments, the buffer 207 in error amplifier 103 may be omitted, and the amplifier 206 could output the error signal EAO directly. For another instance, in another embodiment, the constant on time control circuit 105 may further comprise an AND gate. The AND gate has two input terminals and an output terminal, wherein the two input terminals are respectively coupled to the output terminal of the comparator 210 and the output terminal of the timer 211, the output terminal generates the constant on time control signal TON. Therefore, the constant on time control signal TON are determined by both the output of the PWM comparator 210 and the output of timer 211.

Figure 3:
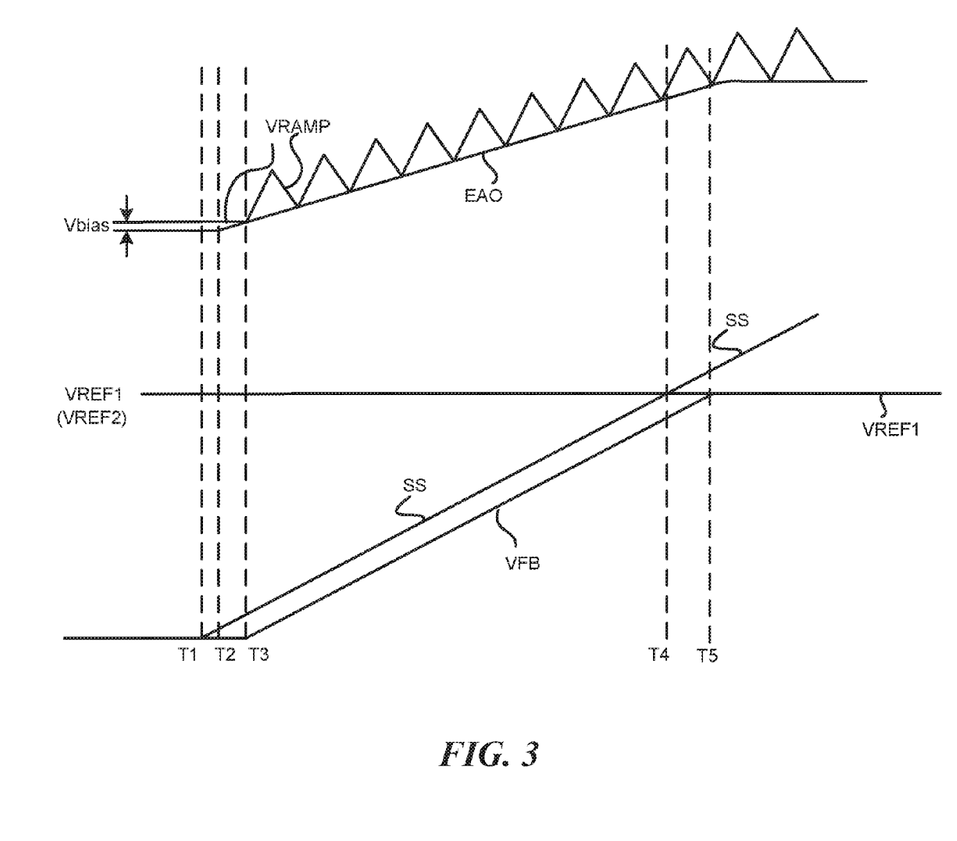
FIG. 3 illustrates an operational waveform diagram of the switching power supply system 10 shown in FIG. 2 according to an embodiment of the present invention.

FIG. 3 illustrates an operational waveform diagram of the switching power supply system 10 shown in FIG. 2 according to an embodiment of the present invention. Based on FIG. 3, the operational process of the switching power supply system 10 will be interpreted in the following text. As shown in FIG. 3, before a moment T1, the system 10 is connected to external power source but not powered on. The soft start signal SS<VREF. Relating to the soft start signal SS and the voltage Vbias generated by DC bias source BIAS, the DC bias of the triangle signal VRAMP makes VRAMP>EAO, preventing any spurious triggering of the timer 211. At the moment T1, the system is powered on, and VOUT=0, VFB=R2×VOUT/(R1+R2)=0. For the soft start signal generator 106, the current source IS begins to charge the capacitor CS1, so that the soft start signal SS rises up from 0 with a relatively small constant slew rate. The soft start signal SS is smaller than the first reference signal VREF1. As a result, according to the feedback signal VFB and the soft start signal SS, the error amplifier 103 generates the error signal EAO the amplitude of which is relatively small.

Because of the slow rising rate of the soft start signal SS and the delay from the buffer 207, until a moment T2, the error signal EAO begins to rise. At a moment T3, the error signal EAO arrives at the same level of the voltage Vbias, turning on the primary switch 201 to charge the output capacitor 204. The output voltage VOUT and the feedback signal VFB begins to rise. Meanwhile, due to the voltage follower 209, the voltage level on the second terminal of the resistor Rc2 follows the voltage level of the soft start signal SS. Accordingly, the DC bias of the triangle signal VRAMP is (Rc2×VOUT+Rc1×SS)/Rc1+Rc2. Hereby the voltage Vbias is ignored due to its small amplitude. By means of the RC network 208, the oscillating amplitude of the triangle signal VRAMP is ton×(VIN−VOUT)/(Rc1×Cc1), wherein ton is the constant on time that is indicated by the constant on time control signal TON. During the starting, the soft start signal SS is small. By setting a suitable resistance ratio of resistors Rc1 and Rc2, the DC bias of the triangle signal VRAMP could be small enough to match the error signal EAO. Continuing in FIG. 3, during the starting, the soft start signal SS rises up with a small slow rate as the current source IS charges the capacitor CS1. Due to the effect of this soft start signal SS, the rising slew rate of the output voltage VOUT and the feedback signal VFB are also small, thus alleviating electrical impact during starting.

There is a slew rate difference between the feedback signal VFB and the soft start signal SS, and this slew rate difference is further amplified by the amplifier 206, which results in a soar of the error signal EAO. Meanwhile, since the DC bias of the triangle signal VRAMP comprises an element of the soft start signal SS, the triangle signal VRAMP could keep matching with the error signal EAO during the rising of the error signal EAO. After a moment T4, the soft start signal SS arrives at the same level as the first reference signal VREF and continues rising. The amplifier 206 begins to compare the difference between the first reference signal VREF1 and the feedback signal VFB. In the illustrated embodiment, VREF1=VREF2, and thus the output of the voltage follower 209 is switched from following the soft start signal SS to following the first reference signal VREF1. At this time, the DC bias of the triangle signal VRAMP is (Rc2×VOUT+Rc1×VREF1)/Rc1+Rc2. After then, the output voltage VOUT and the feedback signal VFB continue rising. At a moment T5, the output voltage VOUT arrives at a desire value, and the switching power supply system 10 finishes starting and enters into steady state. The error signal EAO and the DC bias of the triangle signal VRAMP also remain stable.

Figure 4:
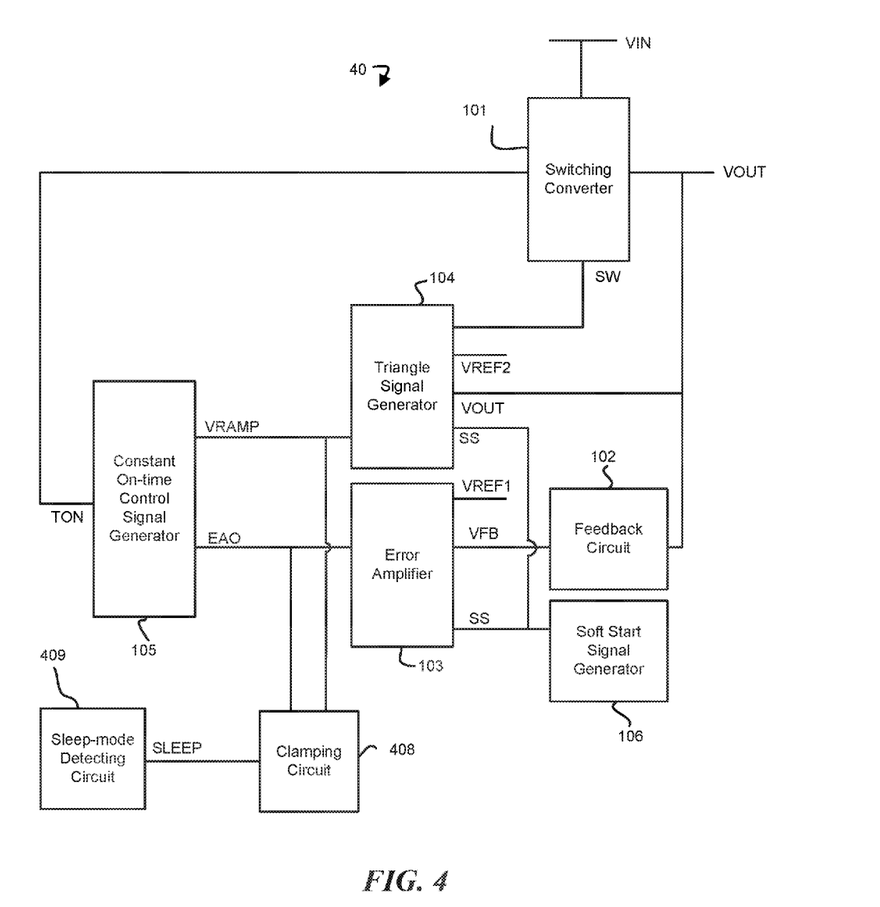
FIG. 4 illustrates a systemic block diagram of a switching power supply system 40 according to another embodiment of the present invention.

FIG. 4 illustrates a systemic block diagram of a switching power supply system 40 according to another embodiment of the present invention. Compared with the switching power supply system 10, the system 40 further comprises a clamping circuit 408 and a sleep-mode detecting circuit 409. The sleep-mode detecting circuit 409 generates a sleep-mode detecting signal SLEEP, configured to indicate whether the system 40 is in the sleep mode. The clamping circuit 408 is coupled to the sleep-mode detecting circuit 409, the triangle signal generator 104 and the error amplifier 103. When the sleep-mode detecting signal SLEEP indicates the system 40 is in sleep mode, the clamping circuit 408 clamps the error signal EAO according to the triangle signal VRAMP and the error signal EAO.

When the system 40 is lightly loaded, the switching converter 101 may work in discontinuous-current-mode, and the switching frequency is relatively low. At this time, if the sleep-mode detecting circuit 409 indicates that the system 40 is in sleep mode, the clamping circuit 408 is enabled. The clamp circuit 408 could prevent the difference between the triangle signal VRAMP and the error signal EAO being enlarged by means of clamping the error signal EAO. As a result, the performance of transient response gets improved under this occasion.

Figure 5:
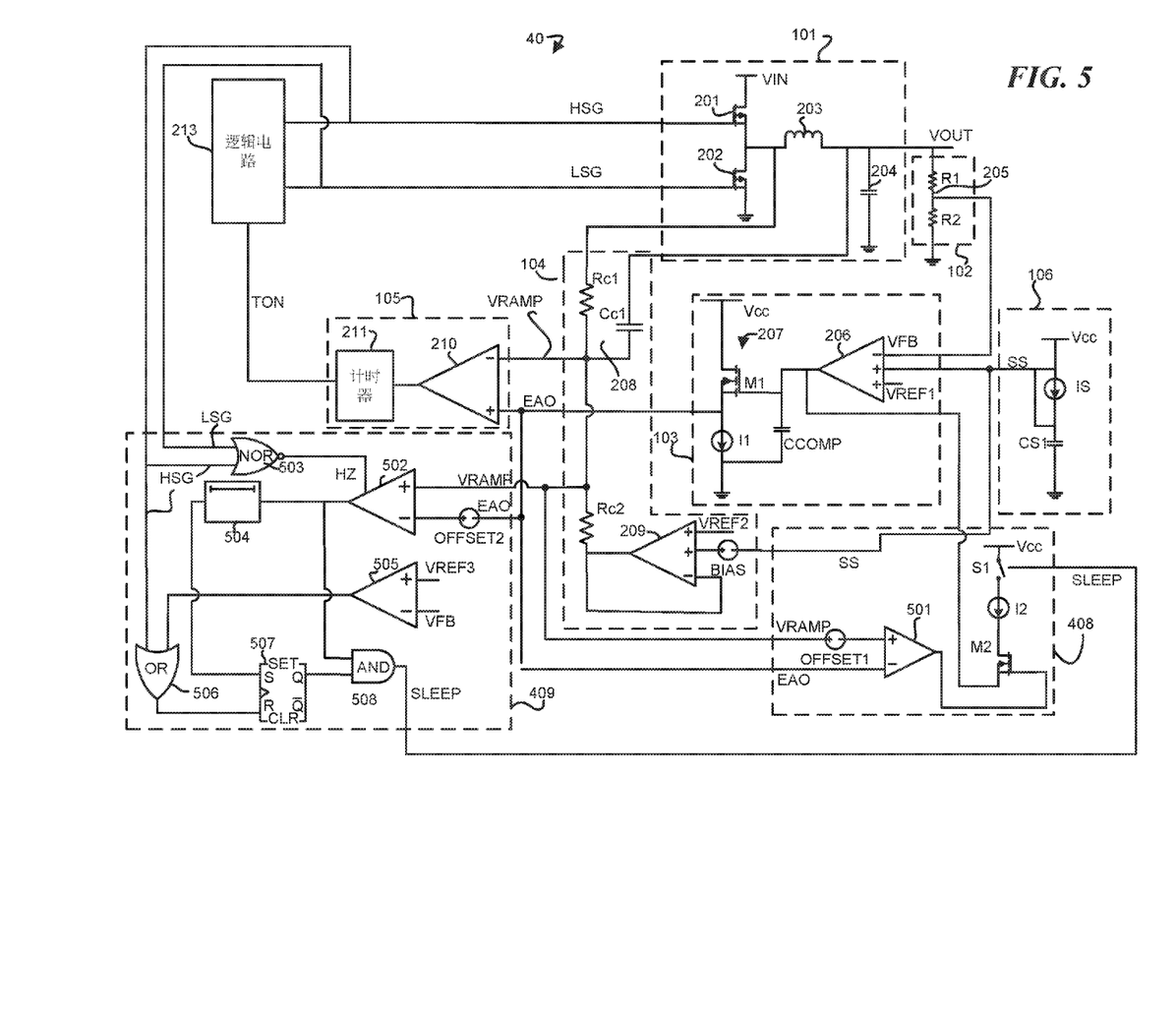
FIG. 5 illustrates a schematic circuit diagram of the switching power supply system 40 according to another embodiment of the present invention.
Figure 6A:
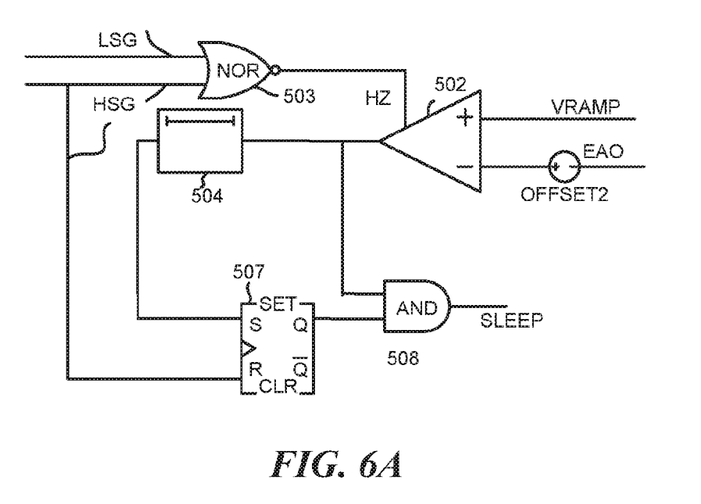
FIG. 6A-6D illustrates schematic circuit diagrams of sleep-mode detecting circuit 409 according to some alternative embodiments of the present invention.
Figure 6B:
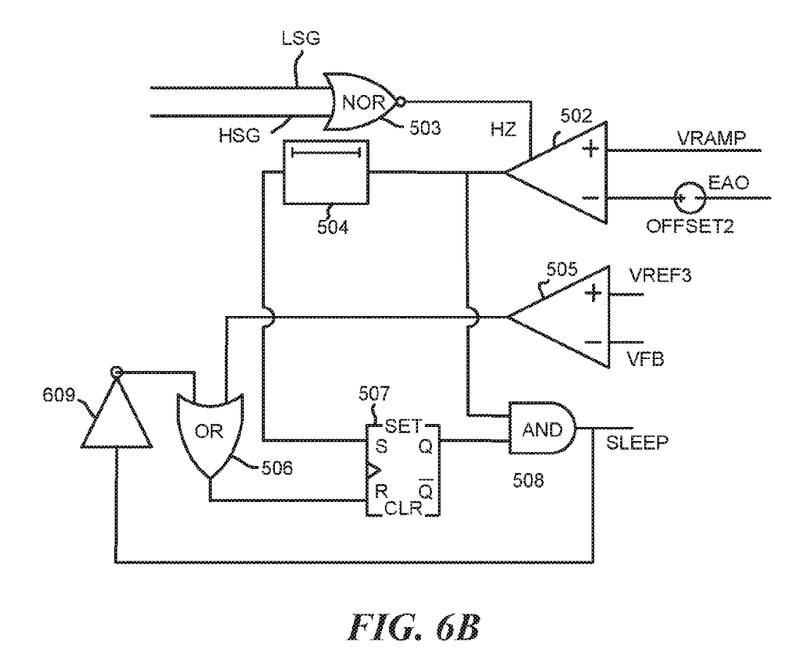
Figure 6C:
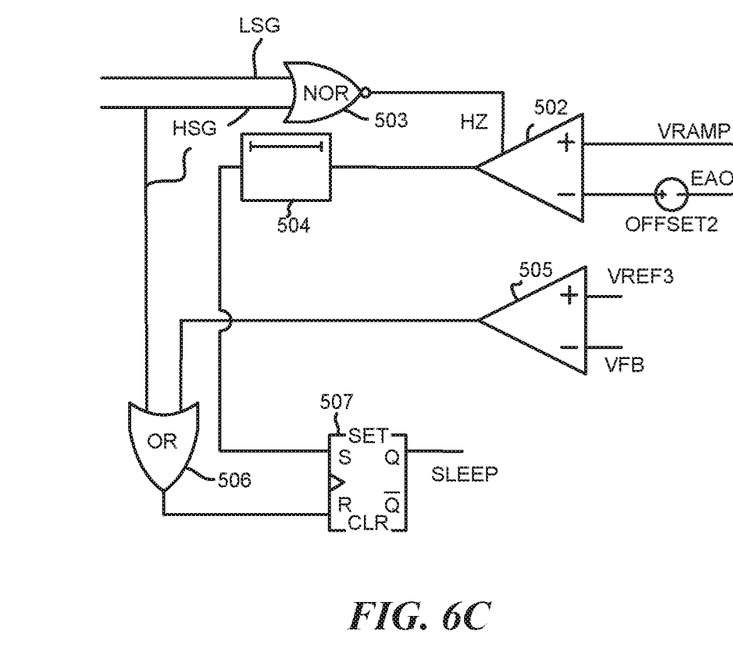
Figure 6D:
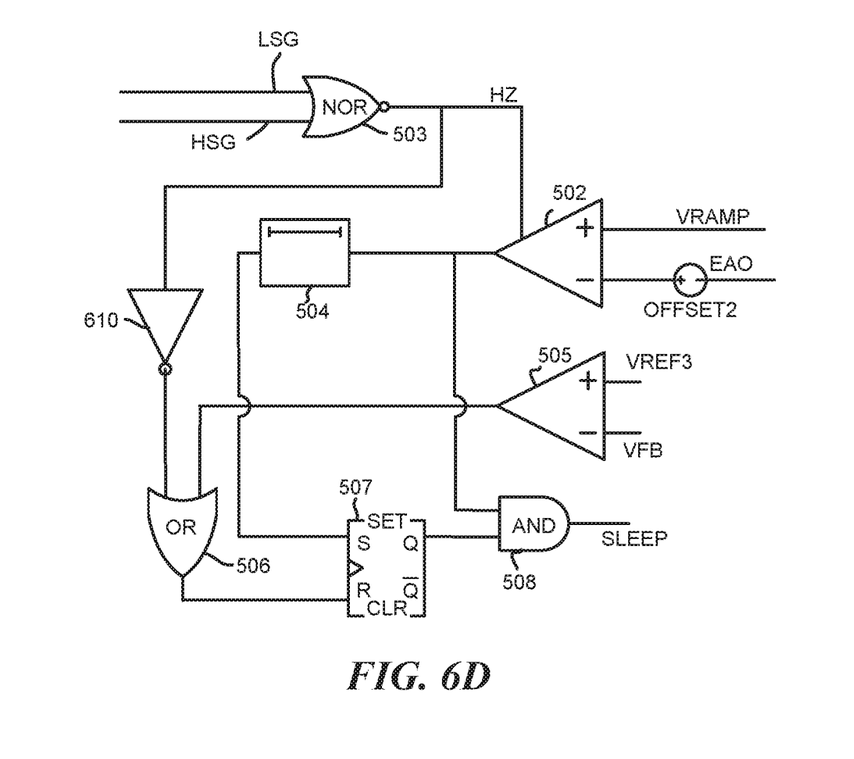

FIG. 5 illustrates a schematic circuit diagram of the switching power supply system 40 according to another embodiment of the present invention. The elements of the illustrated embodiment that are the same with or similar with these shown in FIG. 2 will not be interpreted repeatedly.

As shown in FIG. 5, the clamping circuit 408 comprises a first offset voltage source OFFSET1, an operational amplifier 501, a switch S1, a MOSFET M2, and a current source I2. A positive terminal of the first offset voltage source OFFSET1 is coupled to the output terminal of the triangle signal generator 104 to receive the triangle signal VRAMP, and a negative terminal of the first offset voltage source OFFSET1 is coupled to a non-inverting input terminal of the operational amplifier 501. An inverting input terminal of the operational amplifier 501 receives the error signal EAO. An output terminal of the amplifier 501 is coupled to a gate electrode of the MOSFET M2. A negative terminal of the current source I2 receives the system power supply voltage Vcc via the switch S1, and a positive terminal of the current source I2 is coupled to a drain electrode of the MOSFET M2. A control terminal of the switch S1 receives the sleep-mode detecting signal SLEEP that controls the switch S1 on and off. In one embodiment, when the sleep-mode detecting signal SLEEP is at high level, the switch S1 is turned on. While the sleep-mode detecting signal SLEEP is at low level, the switch S1 is turned off. In other embodiment, the switch S1 may act contrary to above description. A source electrode of the MOSFET M2 is coupled to the error amplifier 103. In the illustrated embodiment, the source electrode of the MOSFET M2 is coupled to the output terminal of the amplifier 206. In other embodiment, the source electrode of the MOSFET M2 could also be coupled to any other suitable node in the error amplifier 103 to perform the clamping function.

In the illustrated embodiment, the clamp circuit 408 clamps the error signal EAO if both the following two conditions are satisfied: (1) the sleep-mode detecting signal SLEEP indicating the system is in sleep mode; (2) the voltage level difference between the error signal EAO and the triangle signal VRAMP being no less than the first offset voltage Voffset1.

One with ordinary skill in the art could understand that in other embodiments, the clamping circuit 408 may have different circuitry structure to perform similar functions. For example, in other embodiment, the clamping circuit 408 may comprise a filter network coupled between the output terminal of the triangle signal generator 104 and the positive terminal of the first offset voltage source OFFSET1, configured to filter alternative current (AC) element in the triangle signal VRAMP. In another embodiment, the positive terminal of the first offset voltage source OFFSET1 may be coupled to the inverting input terminal of the operational amplifier 501 and the negative terminal of the first offset voltage source OFFSET1 receives the error signal EAO.

Continuing in FIG. 5, in one embodiment, the sleep-mode detecting circuit 409 comprises a second offset voltage source OFFSET2, a first comparator 502, a NOR gate 503, a delay circuit 504, a second comparator 505, an OR gate 506 and a flip-flop 507. A negative terminal of the second offset voltage source OFFSET2 is coupled to the output terminal of the error amplifier 503, configured to receive the error signal EAO. The first comparator 502 has a non-inverting input terminal, an inverting input terminal, an enable terminal and an output terminal, wherein the non-inverting input terminal of the first comparator 502 is coupled to the output terminal of the triangle signal generator 104, configured to receive the triangle signal VRAMP. The inverting input terminal of the first comparator 502 is coupled to a positive terminal of the second offset voltage source OFFSET2. At least one input terminal of the NOR gate 503 receives control signal for controlling the at least one power switch in the switching power supply system 40. An output terminal of the NOR gate 503 is coupled to the enable terminal of the first comparator 502, configured to provide a standby signal HZ.

If any of power switch or power switches is on, the NOR gate 503 disables the first comparator 502, and thus the sleep-mode detecting signal SLEEP indicates that sleep mode of the system 40 is terminated. In the illustrated embodiment, the NOR gate 503 has two input terminals, the two input terminals respectively receiving a high side signal HSG to control the primary switch 201 and a low side LSG to control the synchronous rectifier 202. When both the signals HSG and LSG are at low level, the NOR gate 503 outputs a high level HZ signal to enable the second comparator 502. When either the high side signal HSG or the low side signal LSG is at high level (i.e. either the primary switch or the synchronous rectifier 202 is turned on), the first comparator 502 is disabled, and the output of the first comparator 502 is kept at low level. The delay circuit 504 is coupled between the output terminal of the first comparator 502 and a set terminal (S terminal) of the flip-flop 507, configured to delay the output of first comparator 502 for a first delay time TD for preventing any spurious triggering on the sleep-mode detecting circuit 409. In one embodiment, the first delay time TD is 1-2 us. A non-inverting input terminal of the second comparator 505 receives a third reference signal VREF3. In one embodiment, VREF3=0.95VREF1. In other embodiments, the third reference signal VREF3 may have other suitable value. An inverting input terminal of the second comparator 505 receives the feedback signal VFB. The OR gate 506 has two input terminals, the two input terminals respectively receiving the high side signal HSG and the output of the second comparator 505. An output terminal of the OR gate 506 is coupled to a reset terminal (R terminal) of the flip-flop 507. A Q output terminal of the flip-flop 507 provides the sleep-mode detecting signal SLEEP. In another embodiment, the sleep-mode detecting signal SLEEP further comprises an AND gate 508. The AND gate 508 has two input terminals respectively coupled to the Q output terminal of the flip-flop 507 and the output terminal of the first comparator 502. An output terminal of the AND gate 508 generates the sleep-mode detecting signal SLEEP.

In certain embodiments, the offset voltage Voffset1 of the first offset voltage source OFFSET1 is larger than the offset voltage Voffset2 of the second offset voltage source OFFSET2. In one embodiment, the Voffset1 is 50 mV, and the Voffset2 is 15 mV.

In the illustrated embodiment, the power supply system 40 is determined entering into sleep mode if: (1) all of the power switch or power switches in the power supply system 40 being off; and (2) the voltage level difference between the triangle signal VRAMP and the error signal EAO being no less than the second offset voltage Voffset2 for at least the first delay time TD Meanwhile, the power supply system 40 is determined exiting sleep mode if (1) any of the power switch or power switches in the power supply system being on; or (2) the feedback signal VFB being smaller than the third reference signal VREF3.

One with ordinary skill in the art should understand that in other embodiments, the conditions of determining the power supply system entering or exiting the sleep mode, or the conditions of enabling the clamping circuit 408 to clamp the error signal EAO may vary from the above described and the illustrated embodiment. One with ordinary skill in the art should further understand that due to different judging conditions, the circuitry structure of clamping circuit 408 and the sleep-mode detecting circuit 409 may also vary from the embodiments described above. FIG. 6A-6D illustrates schematic circuit diagrams of sleep-mode detecting circuit 409 according to some alternative embodiments of the present invention. For an instance, in the embodiment shown in FIG. 6A, the second comparator 505 and the OR gate 506 are omitted in the sleep-mode detecting circuit 409. The high side signal HSG is directly sent to the reset terminal of the flip-flop 507 to reset the flip-flop. In the embodiment shown in FIG. 6B, the sleep-mode detecting circuit 409 may further comprise an inverter 609. An input terminal of the inverter 609 receives the sleep-mode detecting signal SLEEP, and an output terminal of the inverter 609 is coupled to the input terminal of the OR gate 506 to replace the high side signal HSG. In another embodiment shown in FIG. 6C, the AND gate 508 is omitted and the sleep-mode detecting signal SLEEP is generated on the Q output terminal of the flip-flop 507. In yet another embodiment shown in FIG. 6D, the output terminal of the NOR gate 503 is coupled to the input terminal of the OR gate 506 via an inverter 601 to replace the high side signal HSG.

Figure 7:
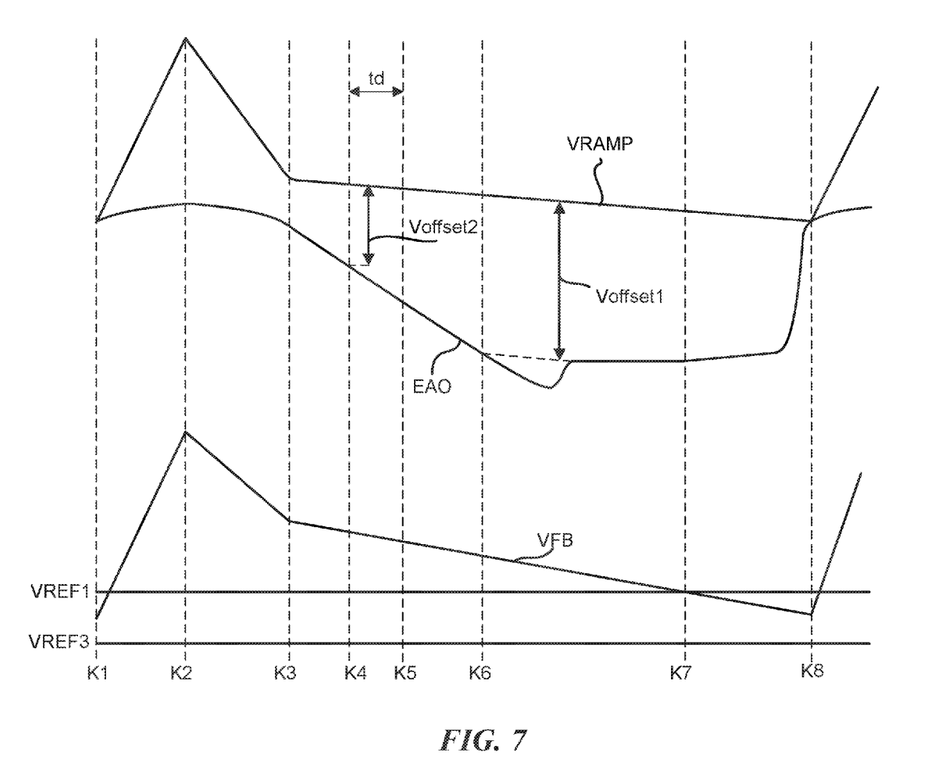
FIG. 7 illustrates an operational waveform diagram of the switching power supply system 40 under lightly loaded condition according to an embodiment of the present invention.

FIG. 7 illustrates an operational waveform diagram of the switching power supply system 40 under lightly loaded condition according to an embodiment of the present invention. Based on FIG. 7, an operational process flow of the switching power supply system 40 will be interpreted in the following text. Seen in FIG. 7, when the system 40 is lightly loaded, it is operating under discontinuous-current mode. At a moment K1, the error signal EAO arrives at the same level of the triangle signal VRAMP, so that the PWM comparator 210 generates a short pulse to the timer 211. The constant on time control signal TON generated from the timer 211 is turned to high level for a constant on time ton. During this period, the primary switch 201 is turned on and the synchronous rectifier 202 is turned off. The switching signal SW=VIN, and the capacitor Cc1 in the RC network 208 is charged. The triangle signal VRAMP rises up, and the output voltage VOUT and the feedback signal VFB as well as the error signal EAO also rise up as VFB>VREF1.

At a moment K2, the constant on time ton ends, and the constant on time control signal TON is turned to low level. The primary switch 201 is turned off and the synchronous rectifier 202 is turned on. The switching signal SW=0, and the capacitor Cc1 is discharged. The triangle signal VRAMP declines. Meanwhile, as the feedback signal VFB falls down, the error signal EAO also declines. At a moment K3, a current on the output inductor 203 falls to zero, and the system enters into discontinuous-current mode. The primary switch 201 and the synchronous rectifier 202 are both turned off. At this time, the standby signal HZ is at high level to enable the first comparator 502 in sleep-mode detecting circuit 409. On the other aspect, the off state of both the primary switch 201 and the synchronous rectifier 202 also makes the switching signal SW=VOUT. The triangle signal VRAMP is substantially equal to the output voltage VOUT.

After the moment K3, the output capacitor 204 is discharged by load, and the output voltage VOUT gradually declines with a relatively small slew rate. However, the error signal EAO rapidly declines due to the amplified falling amplitude of the feedback signal VFB by the amplifier 206, resulting that the voltage level difference between the triangle signal VRAMP and the error signal EAO is gradually enlarged. At the moment K4, the voltage level difference between triangle signal VRAMP and the error signal EAO is equal to Voffset2, so that the first comparator 502 in the sleep-mode detecting circuit 409 generates a high level output. This high level output is delayed by the delay circuit 504 for the first delay time td. Then at a moment K5, the output of the flip-flop 507 is turned over, and thus the sleep-mode detecting signal SLEEP is turned to high level. At this time, the switch S1 in the clamping circuit 408 is turned on. However, since VRAMP−EAO<Voffset1, the clamping circuit 408 does not clamp the error signal EAO, and the error signal EAO continues declining. At a moment K6, the voltage level difference between the error signal EAO and the triangle signal VRAMP is equal to Voffset1. The operational amplifier 501 generates an output to turn the MOSFET M2 on. Thus the current source I1 charges the capacitor CCOMP to prevent the declining of the error signal EAO. After that, the error signal EAO is clamped on a voltage level that is Voffset1 lower than the triangle signal VRAMP.

Once the error signal EAO is clamped, the feedback signal VFB gradually declines. At a moment K7, VFB=VREF1. Then the feedback signal VFB keeps declining and the amplifier 206 begins to charge the capacitor CCOMP. The clamping circuit 408 stops clamping the error signal EAO. The error signal EAO rebounds. As the voltage level difference between the feedback signal VFB and the first reference signal VREF1 is continuously increasing, the charging current of the capacitor CCOMP is also increasing, and the rising rate of the error signal EAO is accelerated. Eventually, at a moment K8, the error signal EAO arrives at the same level of the triangle signal VRAMP again. The primary switch 201 is turned on and the switching power supply system 40 enters into next operational cycle. The high side signal HSG resets the flip-flop 507 in the sleep-mode detecting circuit 409, and the sleep-mode detecting signal SLEEP is turned to low level again. The switch S1 in clamping circuit 408 is turned off to shut down the clamping circuit 408 for preventing energy consumption.

During the clamping of the error signal EAO, whenever the load current of the system steps up, the feedback signal VFB declines dynamically. If the feedback signal VFB=VREF3, the second comparator 505 generates a high level output, resulting that the OR gate 506 generates a high level output to reset the flip-flop 507. The sleep-mode detecting signal SLEEP is turned to low level to cut off the switch S1 in clamping circuit 408. Accordingly, the clamping circuit 509 stops clamping the error signal EAO. As the voltage level difference between the error signal EAO and the triangle signal VRAMP is just equal to Voffset1, the error signal EAO could return to the same level of the triangle signal VRAMP within a short time. Consequently the system 40 could enter into the next operation cycle quickly and the transient response performance is thus improved.

Figure 8:
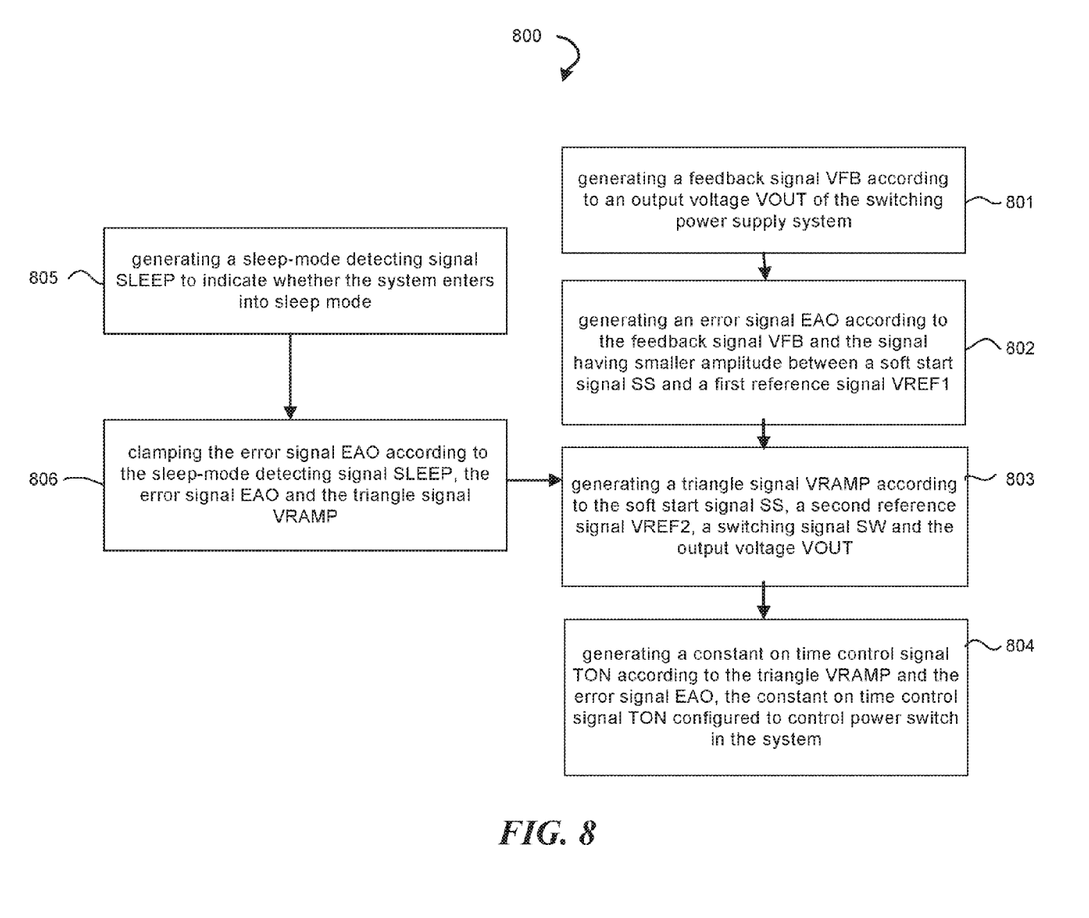
FIG. 8 illustrates a process flow chart of a control method 800 for controlling switching power supply system according to an embodiment of the present invention.

FIG. 8 illustrates a process flow chart of a control method 800 for controlling switching power supply system according to an embodiment of the present invention. As shown in FIG. 8, the method 800 comprises: step 801, generating a feedback signal VFB according to an output voltage VOUT of the switching power supply system; step 802, generating an error signal EAO according to the feedback signal VFB and the signal having smaller amplitude between a soft start signal SS and a first reference signal VREF1; step 803, generating a triangle signal VRAMP according to the soft start signal SS, a second reference signal VREF2, a switching signal SW and the output voltage VOUT; step 804, generating a constant on time control signal TON according to the triangle VRAMP and the error signal EAO, the constant on time control signal TON configured to control power switch or power switches in the system.

Wherein, the triangle signal VRAMP comprises a DC bias. The DC bias relates to the signal having smaller amplitude between the soft start signal SS and the second reference signal VREF2. In one embodiment, the oscillating amplitude of the triangle signal VRAMP is determined by a resistance and a capacitance in a RC network.

In one embodiment, the method may further comprise: step 805, generating a sleep-mode detecting signal SLEEP to indicate whether the system enters into sleep mode; and step 806, clamping the error signal EAO according to the sleep-mode detecting signal SLEEP, the error signal EAO and the triangle signal VRAMP.

In one embodiment, the error signal is clamped if (1) the sleep-mode detecting signal SLEEP indicating that the system is in sleep mode; and (2) the voltage level difference between the error signal EAO and the triangle signal VRAMP being no less than a first offset voltage Voffset1.

In one embodiment, the sleep-mode detecting signal SLEEP indicates the system enters into sleep mode if (1) all power switch or power switches in the system being off; and (2) the voltage level difference between the triangle signal VRAMP and the error signal EAO being no less than a second offset voltage Voffset1 for a first delay period td.

The first offset voltage Voffset1 may be larger than the second offset voltage Voffset2. In one embodiment, the range of the first offset voltage Voffset1 is 30 mV-60 mV, and the range of the second offset voltage Voffset2 is 15 mV-30 mV.

In one embodiment, the sleep-mode detecting signal SLEEP indicates that the system exits the sleep mode if (1) any of the power switch or the power switches in the system is turned on; or (2) the feedback signal VFB being smaller than a third reference signal VREF3.

In one embodiment, VREF3=0.95VREF1.

The above description and discussion about specific embodiments of the present invention is for purposes of illustration. However, one with ordinary skill in the relevant art should know that the invention is not limited by the specific examples disclosed herein. Variations and modifications can be made on the apparatus, methods and technical design described above. Accordingly, the invention should be viewed as limited solely by the scope and spirit of the appended claims.

I claim:

1. A switching power supply system, comprising: a switching converter, comprising at least one power switch, wherein by turning the at least power switch on and off, the switching converter converts an input voltage into an output voltage, and wherein a switching signal is generated by the switching converter; a feedback circuit, receiving the output voltage, operable to generate a feedback signal; an error amplifier, configured to generate an error signal according to the feedback signal and a soft start signal when the soft start signal has smaller amplitude than a first reference signal; a triangle signal generator, configured to generate a triangle signal according to the switching signal, the output voltage and the soft start signal when the soft start signal has smaller amplitude than a second reference signal; a constant on time control circuit, coupled to the error amplifier and the triangle signal generator, the constant on time control circuit configured to receive the error signal and the triangle signal, and operable to generate a constant on time control signal to control the at least one power switch; and wherein the triangle signal comprises a DC bias, and wherein the DC bias is based on either the soft start signal or the second reference signal.

2. The switching power supply system according to claim 1, wherein the system further comprises a soft start signal generator, the soft start signal generator configured to generate the soft start signal when the system is starting, and wherein the constant on time control circuit comprises:
a PWM comparator, having a non-inverting input terminal, an inverting input terminal and an output terminal, wherein the non-inverting input terminal receives the error signal, and wherein the inverting input terminal receives the triangle signal; and
a timer, coupled to the output terminal of the PWM comparator, the timer configured to generate the constant on time control signal according to an output of the PWM comparator.

3. The switching power supply system according to claim 1, wherein the triangle signal generator comprises:
a first resistor, wherein a first terminal of the first resistor receives the switching signal;
a second resistor, wherein a second terminal of the first resistor is coupled to a first terminal of the second resistor;
a first capacitor, wherein a first terminal of the first capacitor receives the output voltage, and wherein a second terminal of the first capacitor is coupled to the second terminal of the first resistor; and
a voltage follower, having two non-inverting input terminals, an inverting input terminal and an output terminal, wherein the two non-inverting input terminals respectively receive the soft start signal and the second reference signal, and wherein the inverting input terminal is coupled to the output terminal of the voltage follower, and further wherein the output terminal of the voltage follower is coupled to a second terminal of the second resistor, and is configured to provide the triangle signal.

4. The switching power supply system according to claim 1, wherein the second reference signal is equal to the first reference signal.

5. The switching power supply system according to claim 1, further comprising:
   a sleep-mode detecting circuit, configured to generate a sleep-mode detecting signal to indicate whether the system enters into sleep mode; and
   a clamping circuit, coupled to the sleep-mode detecting circuit, the triangle signal generator and the error amplifier, the clamping circuit configured to clamp the error signal according to the triangle signal and the error signal when the system is in sleep mode.

6. The switching power supply system according to claim 5,
   wherein the clamping circuit clamps the error signal if (1) the sleep-mode detecting signal indicating that the system enters into sleep mode, and (2) the voltage level difference between the error signal and the triangle signal is larger than a first offset voltage; and
   wherein the sleep-mode detecting signal indicates that the system enters into sleep mode if (1) all of the at least one power switch in the system is off, and (2) the voltage level difference between the error signal and the triangle signal is larger than a second offset voltage for a first delay time period; and
   wherein the sleep-mode detecting signal indicates that the system exits the sleep mode if (1) any of the at least one power switch in the system is on, or (2) the feedback signal is smaller than a third reference signal.

7. The switching power supply system according to claim 6, wherein the first offset voltage is larger than the second offset voltage.

8. The switching power supply system according to claim 6, wherein the third reference signal is equal to 0.95 times of the first reference signal.

9. The switching power supply system according to claim 5, wherein the clamping circuit comprises:
   a first offset voltage source, wherein a positive terminal of the first offset voltage source is coupled to the output terminal of the triangle signal generator to receive the triangle signal;
   an operational amplifier, wherein the operational amplifier is coupled to a negative terminal of the first offset voltage with a non-inverting input terminal, and wherein an inverting input terminal of the operational amplifier receives the error signal;
   a first switch, wherein the first switch is turned on and off according to the sleep-mode detecting signal;
   a current source, wherein a positive terminal of the current source receives a system power supply voltage via the first switch; and
   a MOSFET, wherein a gate electrode of the MOSFET is coupled to an output terminal of the operational amplifier, and wherein a drain electrode of the MOSFET is coupled to a negative terminal of the current source, and further wherein a source electrode of the MOSFET is coupled to the error amplifier.

10. The switching power supply system according to claim 5, wherein the system further comprises a logic circuit, receiving the constant on-time control signal, operable to generate at least one control signal for controlling the at least one power switch, and wherein the sleep-mode detecting circuit comprises:
   a second offset voltage source, wherein a negative terminal of the second offset voltage source is coupled to the output terminal of the error amplifier configured to receive the error signal;
   a first comparator, having a non-inverting input terminal, an inverting input terminal, an enable terminal and an output terminal, wherein the non-inverting input terminal is coupled to the output terminal of the triangle signal generator configured to receive the triangle signal, and wherein the inverting input terminal of the first comparator is coupled to a positive terminal of the second offset voltage source;
   a NOR gate, having at least one input terminal and an output terminal, wherein the at least one input terminal is configured to receive the at least one control signal, and wherein the output terminal of the NOR gate is coupled to the enable terminal of the first comparator, and is configured to provide a standby signal;
   a delay circuit, coupled to the output terminal of the first comparator with an input terminal, the delay circuit configured to delay an output from first comparator for a first delay time period; and
   a flip-flop, having a set terminal, a reset terminal and an output terminal, wherein the set terminal of the flip-flop is coupled to an output terminal of the delay circuit, and wherein the reset terminal of the flip-flop receives a control signal which controls a primary switch of the switching power supply system, and further wherein the output terminal of the flip-flop provides the sleep-mode detecting signal.

11. A switching power supply controller, configured to control at least one power switch in a switching converter to generate a switching signal and to convert an input voltage to an output voltage, the switching power supply controller comprising: a feedback circuit, receiving the output voltage, operable to generate a feedback signal based on the output voltage; an error amplifier, coupled to the feedback signal, the error amplifier is configured to generate an error signal according to the feedback signal and a soft start signal when the soft start signal has smaller amplitude than a first reference signal; a triangle signal generator, coupled to the switching converter, the triangle signal generator configured to generate a triangle signal according to the switching signal, the output voltage and the soft start signal when the soft start signal has smaller amplitude than a second reference signal; a constant on time control circuit, coupled to the error amplifier and the triangle signal generator, the constant on time control circuit configured to receive error signal and the triangle signal, and operable to generate a constant on time control signal to control the at least one power switch; and wherein the triangle signal comprises a DC bias, and wherein the DC bias is based on either the soft start signal or the second reference signal.

12. The switching power supply controller according to claim 11, further comprising:
   a sleep-mode detecting circuit, configured to generate a sleep-mode detecting signal to indicate whether the system enters into sleep mode; and
   a clamping circuit, coupled to the sleep-mode detecting circuit, the triangle signal generator and the error amplifier, the clamping circuit configured to clamp the error signal according to the triangle signal and the error signal when the system enters into sleep mode.

13. A control method for controlling switching power supply system, comprising:
   generating a feedback signal according to an output voltage of the switching power supply system;

generating an error signal according to the feedback signal and a soft start signal when the soft start signal has smaller amplitude than a first reference signal;

generating a triangle signal according to a switching signal and the output voltage and the soft start signal when the soft start signal has smaller amplitude than a second reference signal; and generating a constant on time control signal according to the triangle and the error signal, the constant on time control signal controlling power switch in the switching power supply system;

wherein the triangle signal comprises a DC bias and wherein the DC bias is based on either the soft start signal or the second reference signal.

14. The method for controlling switching power supply system according to claim 13, wherein the second reference signal is equal to the first reference signal.

15. The method for controlling switching power supply system according to claim 13, further comprising:

generating a sleep-mode detecting signal; and clamping the error signal according to the sleep-mode detecting signal, the error signal and the triangle signal.

16. The method for controlling switching power supply system according to claim 13, wherein the error signal is clamped if (1) the sleep-mode detecting signal indicating that the switching power supply system enters into sleep mode; and (2) the voltage level difference between the error signal and the triangle signal being no less than a first offset voltage.

17. The method for controlling switching power supply system according to claim 15, wherein the sleep-mode detecting signal indicates the switching power supply system enters into sleep mode if (1) all of the at least one power switch in the switching power supply system is off; and (2) the voltage level difference between the error signal and the triangle signal being no less than a second offset voltage for a first delay time period.

18. The method for controlling switching power supply system according to claim 15, wherein the sleep-mode detecting signal indicates the switching power supply system exits sleep mode if (1) any of the at least one power switch in the power supply system is on; or (2) the feedback signal being smaller than a third reference signal.

\* \* \* \* \*